No. 731,610. PATENTED JUNE 23, 1903.
W. H. PAYNE.
FUMIGATING TENT.
APPLICATION FILED OCT. 13, 1902.
NO MODEL.

Witnesses
Inventor
William H. Payne.
By Jas. J. Sheehy
Attorney

No. 731,610. Patented June 23, 1903.

UNITED STATES PATENT OFFICE.

WILLIAM HUBERT PAYNE, OF MONROVIA, CALIFORNIA.

FUMIGATING-TENT.

SPECIFICATION forming part of Letters Patent No. 731,610, dated June 23, 1903.

Application filed October 13, 1902. Serial No. 127,115. (No model.)

*To all whom it may concern:*

Be it known that I, WILLIAM HUBERT PAYNE, a citizen of the United States, residing at Monrovia, in the county of Los Angeles and State of California, have invented new and useful Improvements in Fumigating-Tents, of which the following is a specification.

My invention relates to tents for covering fruit-bearing and other trees incident to fumigation thereof; and it has for its object to provide a graduated tent calculated when it is placed over a tree to apprise an operator of the quantity of material necessary to fumigate the tree, this with a view of assuring uniform fumigation of all of the trees of an orchard and avoiding waste of fumigating material.

With the foregoing in mind the invention will be fully understood from the following description and claims when taken in connection with the accompanying drawings, in which—

Figure 1:
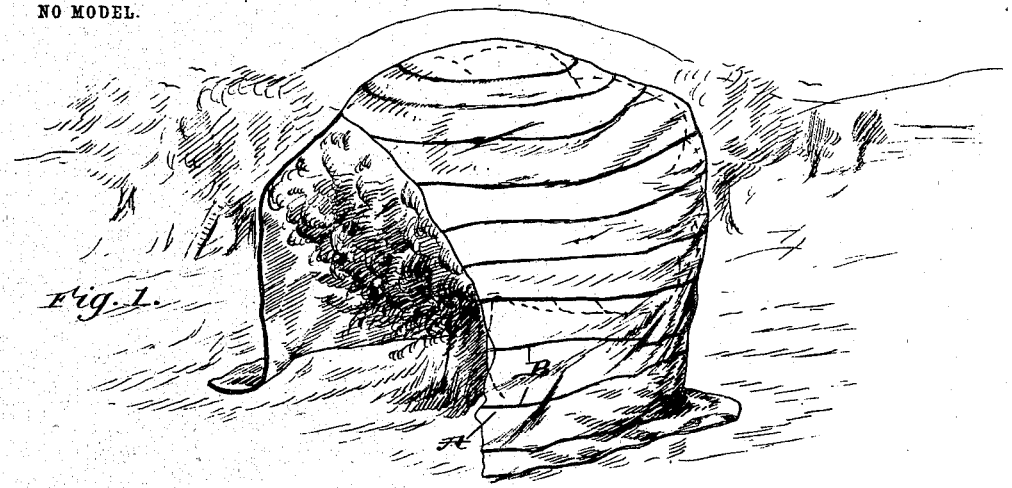
Figure 2:
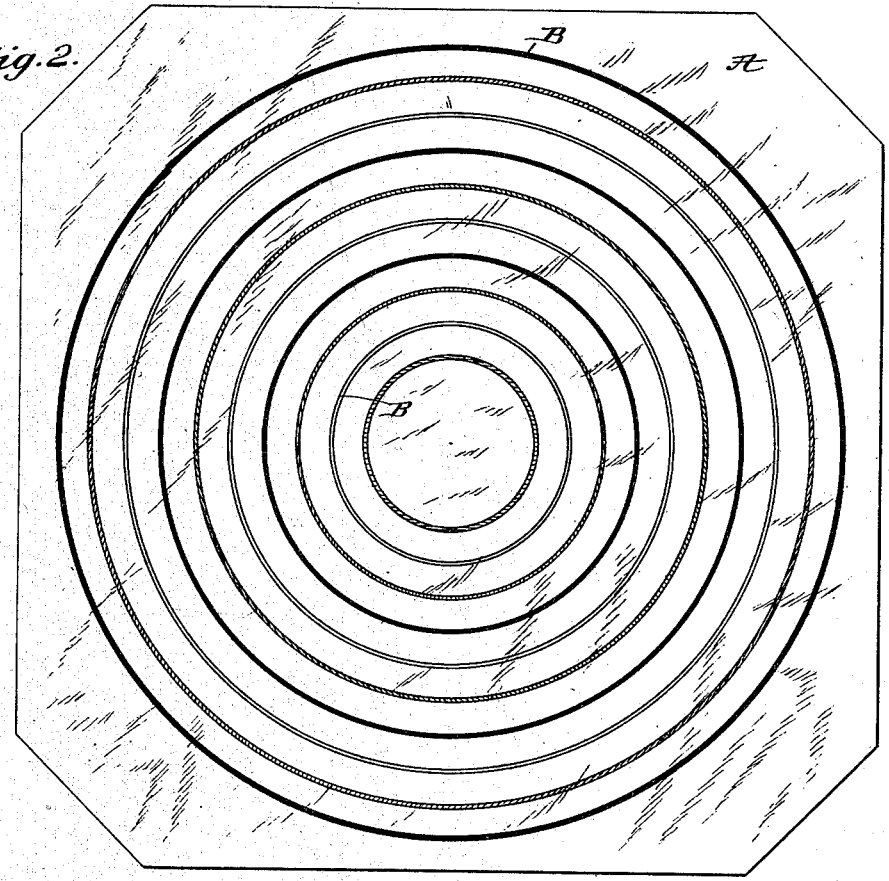

Figure 1 is a view illustrating a graduated tent constituting one embodiment of my invention as it appears when placed over a tree, the tent being partly broken away. Fig. 2 is a plan view of the tent as it appears when spread out.

Similar letters of reference designate corresponding parts in both views of the drawings, referring to which—

A is my improved tent, which is preferably formed in one piece of textile or other suitable material, and B B are the graduations of the tent—i. e., marks or lines formed in or on the material at a suitable distance apart. The graduations in the preferred embodiment of the invention are concentric circular lines, as best shown in Fig. 2, and when the tent is of a size to cover trees up to thirty-six feet in height experience has shown that the graduations may be placed as much as two feet apart. When desirable, the graduations may be differently colored, as shown in Fig. 2, or may be otherwise differentiated. It is not essential, however, to differentiate the graduations, since the operator is enabled by counting the number of graduations or rings resting on the ground after the tent is placed over a tree to determine the quantity of fumigating material to be used.

In using the improved tents an operator cognizant of the quantity of cyanid of potassium or other fumigating material which it is proper to use when any one of the graduations B rests above and next to the ground accompanies the tent through an orchard. When the tent is placed over the tree, the operator ascertains the number of the graduations resting on the ground or the particular graduation resting above and next to the ground and measures the proper quantity of fumigating material or chemicals and places it under the tent. After the tree covered by the tent is thoroughly fumigated the tent is removed and placed over another tree, and the operation described is repeated.

It will be readily appreciated from the foregoing that my improved tent apprises the intelligent operator of the quantity of fumigating material to be used for each tree, and thereby assures the uniform fumigation of all of the trees of an orchard and avoids waste of fumigating material and makes fumigation a certainty and not guesswork, as at present.

Having described my invention, what I claim, and desire to secure by Letters Patent, is—

1. As an improved article of manufacture, a graduated tent for use incident to the fumigation of trees.

2. As an improved article of manufacture, a tent adapted to be placed over trees, and having marks or lines arranged at intervals between its bottom and top.

3. As an improved article of manufacture, a tent adapted to be placed over trees, and having differentiated marks or lines arranged at intervals between its bottom and top.

4. As an improved article of manufacture, a tent adapted to be placed over trees, and having a plurality of equidistant, concentric circular lines for the purpose described.

5. As an improved article of manufacture, a tent adapted to be placed over trees, and having equidistant, circular lines differentiated from each other.

In testimony whereof I have hereunto set my hand in presence of two subscribing witnesses.

WILLIAM HUBERT PAYNE.

Witnesses:
C. E. SLOSSON,
D. G. STEPHEN.